United States Patent [19]
Kaun

[11] Patent Number: 5,896,908
[45] Date of Patent: Apr. 27, 1999

[54] AWNING EXTENSION AND RETRACTION APPARATUS

[75] Inventor: Elden Kaun, Penhold, Canada

[73] Assignee: Petrokaun Oils Ltd., Penhold, Canada

[21] Appl. No.: 08/888,510

[22] Filed: Jul. 7, 1997

[51] Int. Cl.$^6$ ............................................. E04F 10/06
[52] U.S. Cl. ................................................ 160/67; 160/310
[58] Field of Search ............................. 160/67, 66, 68, 160/70, 71, 310, 311, 22; 135/88.11, 88.12

[56] References Cited

U.S. PATENT DOCUMENTS

| | | | |
|---|---|---|---|
| 4,478,268 | 10/1984 | Palmer | 160/272 X |
| 4,745,959 | 5/1988 | Rist | 160/66 |

*Primary Examiner*—David M. Purol
*Attorney, Agent, or Firm*—David S. Thompson

[57] ABSTRACT

An awning extension and retraction apparatus is disclosed. The apparatus is adaptable to being powered by an electrical motor if desired. Left and right support arms are carried by a low position on a supporting wall, and provide telescoping inner and outer support arms. These arms move from a vertical orientation when the awning is retracted, to an angular position when the awning is extended. Hinged left and right rafter arms are carried by an upper position on a supporting wall, and provide an inner rafter arm adjacent to the supporting wall, and an outer rafter arm connected to a roller tube supporting the awning fabric. The inner and outer rafter arms are connected at a mid-point by an elbow joint allowing them to extend from a folded position when the awning is retracted to an extended, locked position when the awning is extended.

5 Claims, 8 Drawing Sheets

FIG. 8A

AWNING EXTENSION AND RETRACTION APPARATUS

CROSS-REFERENCES

There are no applications related to this application filed in this or any foreign country.

BACKGROUND

A variety of retractable awnings have been adapted for use with recreational vehicles and trailers. Such awnings provides an extended position that provides protection from the weather and a retracted position that allows transportation.

Prior art retractable awnings typically have a number of shortcomings. In most prior art awnings, the locking mechanism used to lock the support arms in place is cumbersome and does not function automatically. Most awnings are not adjustable, or are difficult to adjust. Further, most awnings are not adapted to be electrically operated.

What is needed is an awning that is easily operated, with locking arms that function automatically. The awning must also provide adjustment structures that allow both the awning height and fabric tightness to be adjusted.

SUMMARY

The present invention is directed to an apparatus that satisfies the above needs. The awning extension and retraction device of the present invention provides some or all of the following structures.

(A) An awning assembly, possibly including a roller suited for carrying a fabric awning and a drive sprocket, both carried by an axle.

(B) Left and right support arms, each support arm possibly including:
  (a) a bottom receiving rail assembly, possibly including:
    (i) a support bracket, carried by a lower portion of the supporting wall; and
    (ii) a rail body, defining a plurality of adjustment holes, pivotably carried by the support bracket.
  (b) a lower support arm, possibly including:
    (i) A rail body; and
    (ii) an adjustment handle, carried by the rail body, for adjusting the connection between the lower supporting arm and the bottom receiving rail assembly.
  (c) an upper support arm, possibly including:
    (i) a rail body;
    (ii) a extension pulley, carried by the rail body;
    (iii) a travel pulley, carried by the rail body;
    (iv) an upper bracket, carried by the rail body; and
    (v) a sprocket, carried by the axle within the upper bracket;
  (d) an adjustable stop device, carried by the lower support arm, for preventing the lower support arm from separating from the upper support arm;
  (e) an adjustment slide, slidably carried within the rail body of the upper support arm, possibly including:
    (i) a slide body carrying upper and lower flanges;
    (ii) a tension bolt, carried by the upper flange, the tension bolt supporting a locking arm catch rod; and
    (iii) an awning height adjustment bolt, carried by the lower flange;
  (f) a chain having a first end attached to the tension bolt, and having a middle portion passing around the sprocket;
  (g) a travel pulley, having a first end attached to the adjustment slide, a middle portion wrapped about the travel pulley and a second end attached to a second end of the chain; and
  (h) a extension pulley wire, having a first end attached to the awning height adjustment bolt, a middle portion wrapped about the extension pulley and a second end attached to the lower support arm.

(C) Left and right rafter arms, each rafter arm possibly including:
  (a) an inner rafter arm, possibly including:
    (i) an attachment bracket, carried by an upper portion of the supporting wall; and
    (ii) a rail body, pivotally carried by the attachment bracket;
  (b) an outer rafter arm, possibly including:
    (i) a compound rail body, pivotally carried by the rail body of the inner rafter arm, typically including inner and outer rail portions slidably carried on an inside rod, the outer rail portion defining a locking arm pivot;
    (ii) a spring or similar biasing structure, carried by the inner and outer rail portions of the compound rail body, for pushing the inner and outer rail portions together;
    (iii) a stop device, in carried by the inner rafter arm and the outer rafter arm, for preventing the inner and outer rafter arms from assuming an over-center configuration; and
    (iv) a locking arm, carried by the locking arm pivot, having a lower end defining a bifurcated catch sized to engage the locking arm catch rod carried by the tension bolt; and (D) a drive assembly, carried by at least one upper support arm, typically including a motor having a drive chain in communication with the drive sprocket.

It is therefore a primary advantage of the present invention to provide a novel awning extension and retraction apparatus which is reliable, automatic and motor-driven.

Another advantage of the present invention is to provide a novel awning extension and retraction apparatus that is fully adjustable, with an adjustable slide member having separate fabric tension and awning height adjustment elements, as well as a separate awning height adjustment assembly for use after the awning has been extended for use in response to rain or changing sun angle.

Another advantage of the present invention is to provide a novel awning extension and retraction apparatus that provides an adjustable stop assembly to regulate the degree to which an upper support arm may telescope out of a lower support arm as the awning is extended.

A still further advantage of the present invention is to provide a novel awning extension and retraction apparatus having a locking arm, carried by the upper rafter arm, which engages a catch carried by an adjustment slide as the awning is fully extended, thereby maintaining the awning in a rigid configuration.

DRAWINGS

These and other features, aspects, and advantages of the present invention will become better understood with regard to the following description, appended claims, and accompanying drawings where:

FIG. 1 is a perspective view of an RV having a version of the awning extension and retraction apparatus of the invention, wherein the awning is retracted;

3

DESCRIPTION

Figure 1:
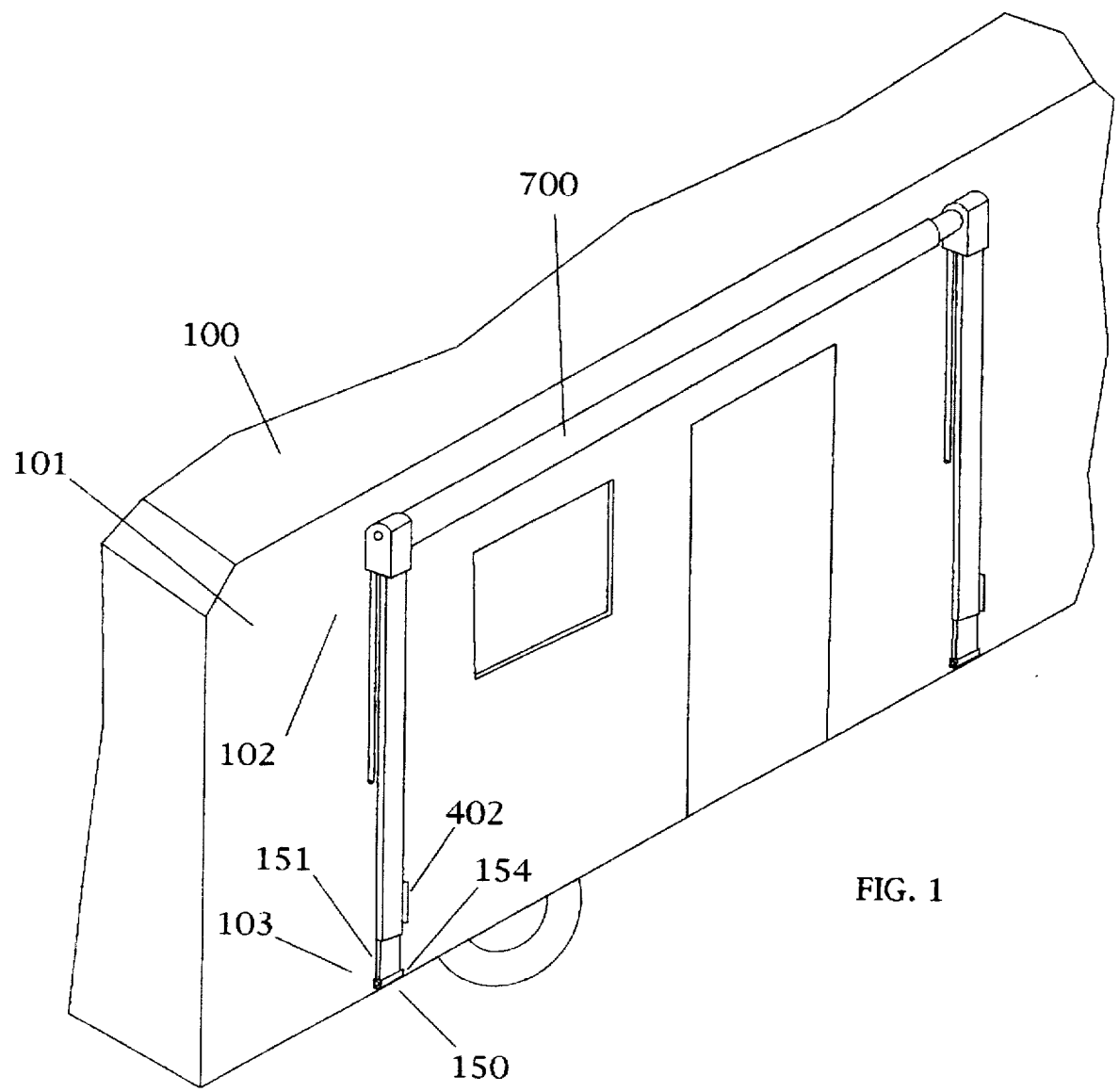

Referring in general to the figures, an awning extension and retraction apparatus constructed in accordance with the principles of the invention is seen. The apparatus is mounted on a supporting wall 101 or a recreational vehicle 100, or other structure. The apparatus provides an awning assembly 700 having a rolled awning 701 carried by a roller 702 on an axle 710. The awning assembly is carried by left and right rafter arms, and supported from below by left and right support arms. The left and right support arms are each formed by a lower support arm 400 and an upper support arm 200. The left and right rafter arms are each formed by an inner rafter arm 500 pivotably carrying an outer rafter arm 600. A drive assembly 800 having a motor 801 driving the axle 710 extends or retracts the awning assembly automatically.

Figure 2:
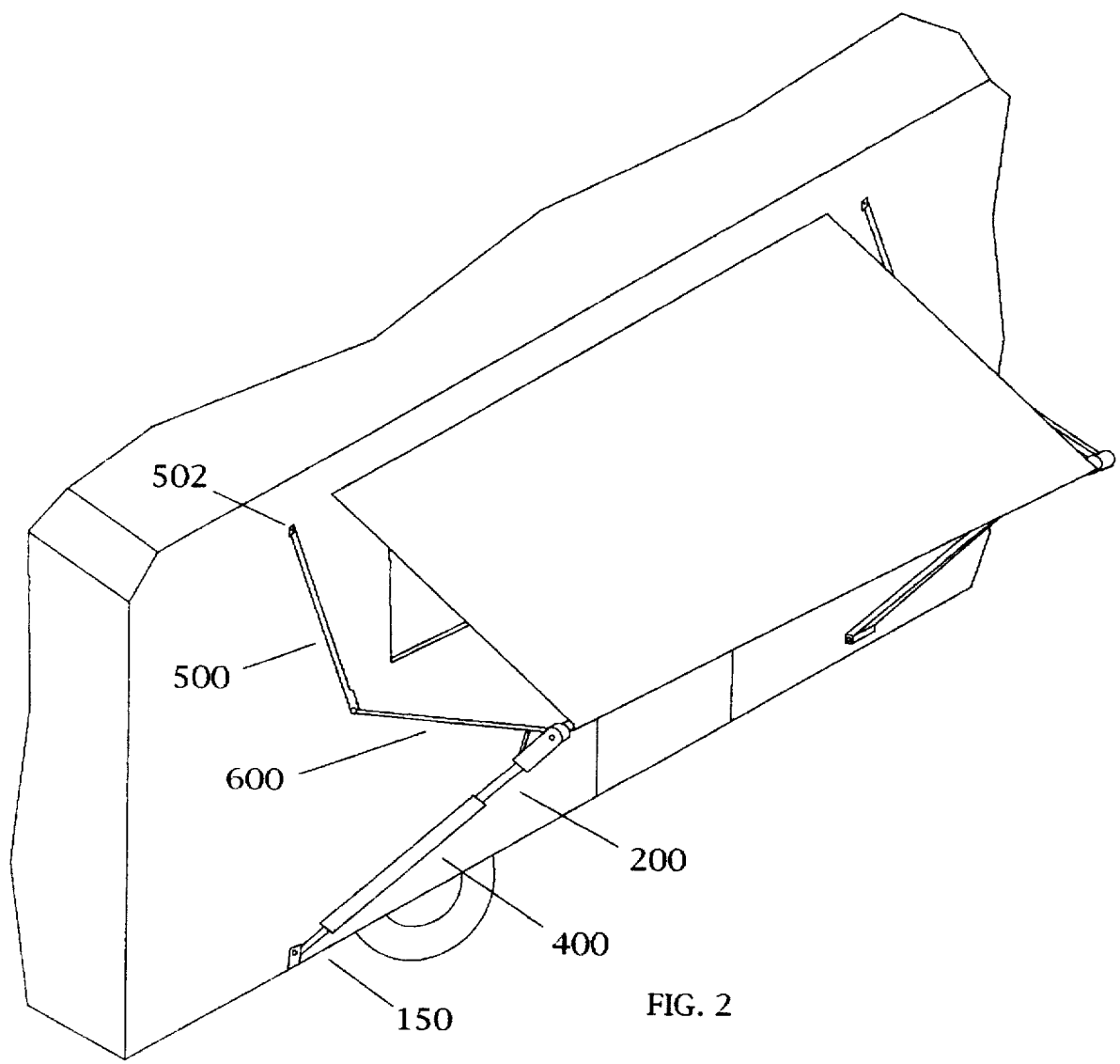
FIG. 2 is a perspective view of the apparatus of FIG. 1, wherein the awning is halfway extended.
Figure 3:
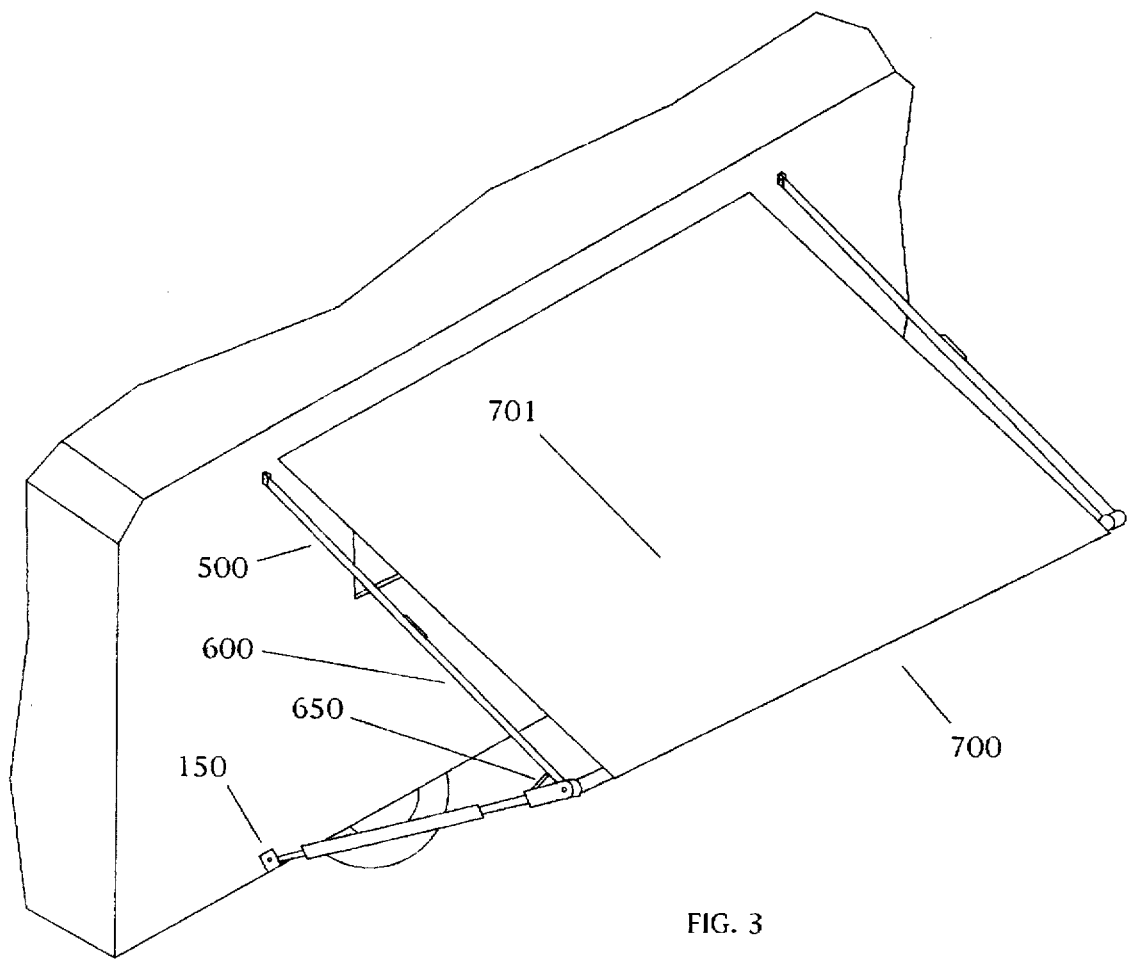
FIG. 3 is a perspective view of the apparatus of FIG. 1 wherein the awning is fully extended.
Figure 4:
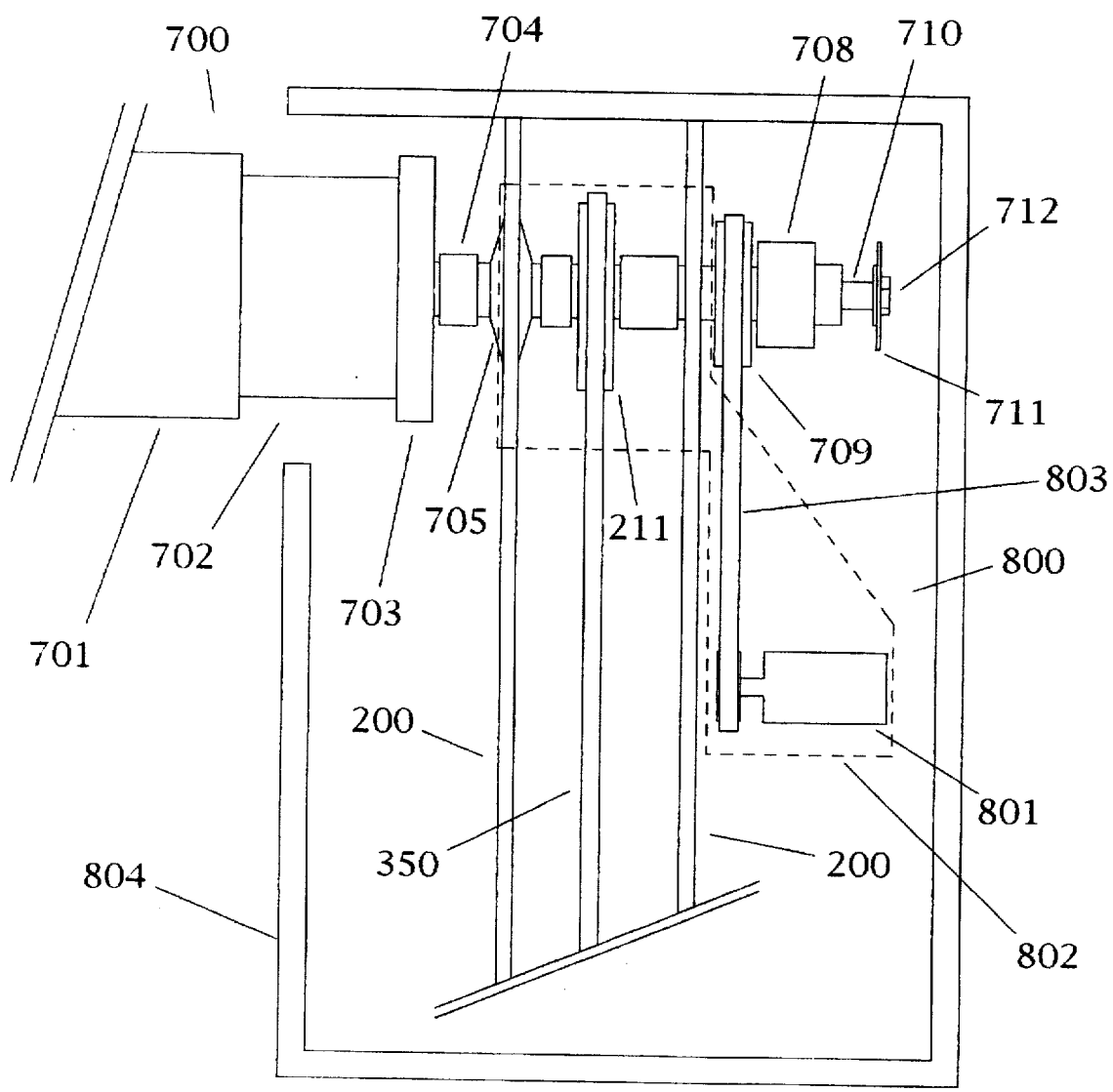
FIG. 4 is an enlarged isometric view of a portion of a version of the awning assembly and the drive assembly of the invention.

Referring to FIGS. 1-4, an awning assembly 700 provides a rolled awning 701 carried by a roller 702. Referring particularly to FIG. 4, a roll cap 703 is supported by the end of the roller, and defines a center hole carrying an axle 710. A lock collar 704 is carried by the axle, and prevents unwanted sliding by the roller on the axle. Rubber grommets 705, are carried by the axle on either side of the rail body 201 of the upper support arm 200, and reduce friction between the axle and support arm. A drive sprocket 709 is carried by the axle adjacent to the upper support arm, and supports a chain 350. A key way 708 is carried by the axle 710 on the inside of the upper support arm. Washer 711 and nut 712 prevent the axle from releasing the upper support arm.

Figure 6:
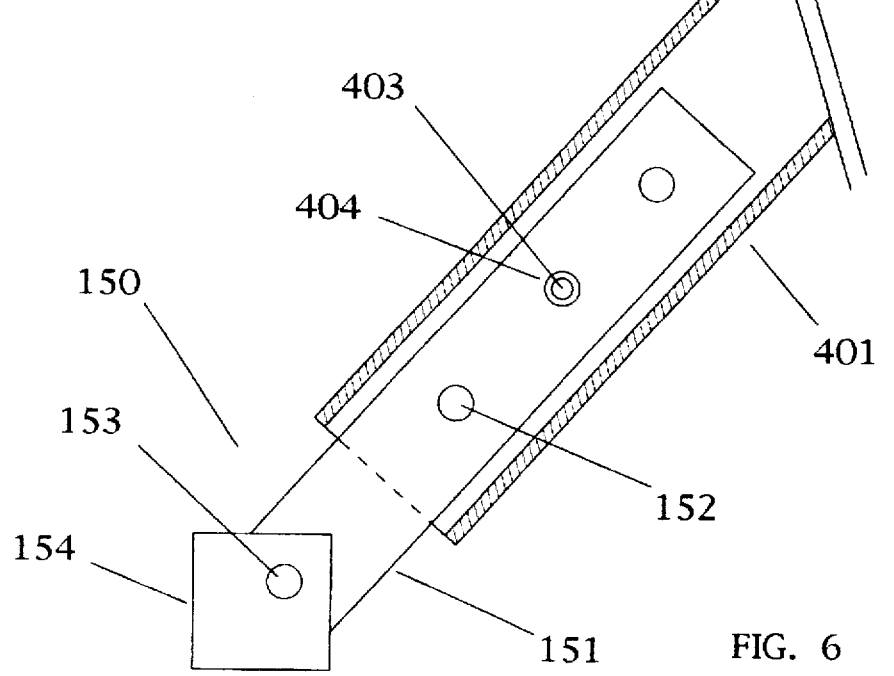
FIG. 6 is an enlarged view of the bottom receiving rail assembly of FIG. 1.

Referring to FIGS. 1 and 6, a bottom receiving rail assembly 150 is seen. The bottom receiving rail assembly connects the awning extension and retraction apparatus to a lower portion 103 of the supporting wall 101 of the RV 100 or other structure. A support bracket 154 is attached to the lower portion 103 of the wall. The support bracket provides a pivot bolt 153 or similar means of connection which allows rotation of a rail body 151. The rail body 151 defines a number of spaced adjustment holes 152, as seen in FIG. 6. The rail body 151 is sized to slide within the rail body 401 of the lower supporting arm 400.

Left and right support arms are formed from telescopically related upper and lower support arms 200, 400. Referring to FIGS. 3, 6, 7 and 9, a lower support arm 400 is seen. The lower support arm provides a rail body 401 sized to slide smoothly over the rail body 151 of the bottom receiving rail assembly. This allows the user to adjust the height of the awning in the event of rain, or to more desirably orient the awning to block the sun. An adjustment handle 402 controls the movement of an adjustment pin 403 through a pin hole 404. The adjustment pin is sized for insertion into any of the adjustment holes 152 of the bottom receiving rail. By inserting the pin into an adjustment hole, the extension of the rail body 401 may be determined.

Figure 9:
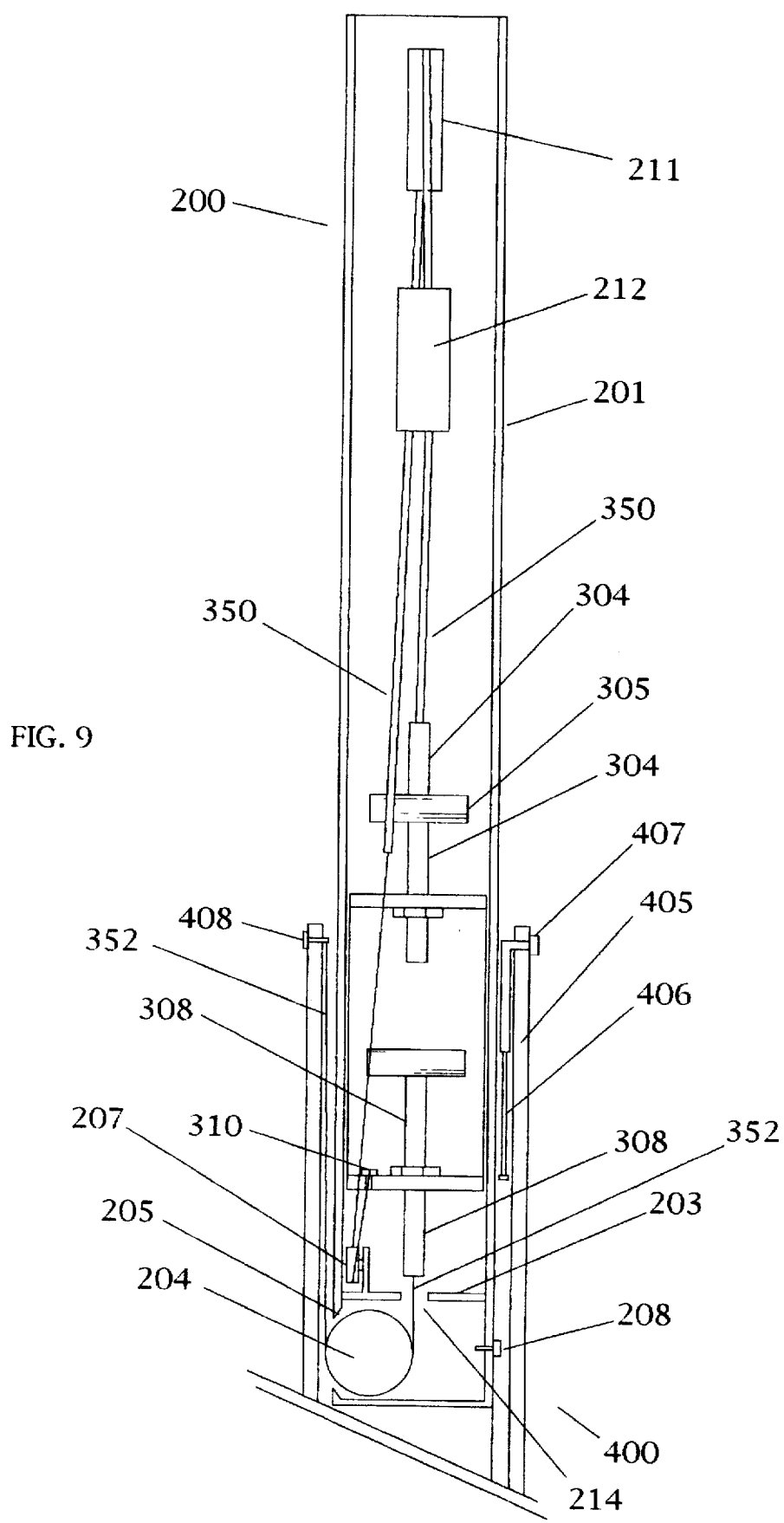
FIG. 9 is a somewhat diagrammatic top plan view of the upper support arm, adjustment slide, and a portion of the lower support arm, seen at 90 degrees to the view of FIG. 7.

Referring to FIG. 9, an adjustable stop assembly 405 prevents the upper support arm 200 from inadvertently disengaging from the lower support arm 400. The stop assembly provides an adjustable length arm 406 and an attachment bolt 407 which fastens the adjustable length arm in place to the lower support arm. The adjustable length arm may comprise two threaded elements whose overall length may be altered by the degree to which they are threaded together. When a stop pin 208, carried by the upper support arm 200, comes in contact with the lower portion of the arm 406, the sliding movement of the upper support arm 200 within to the lower support arm 400 is stopped.

Figure 7:
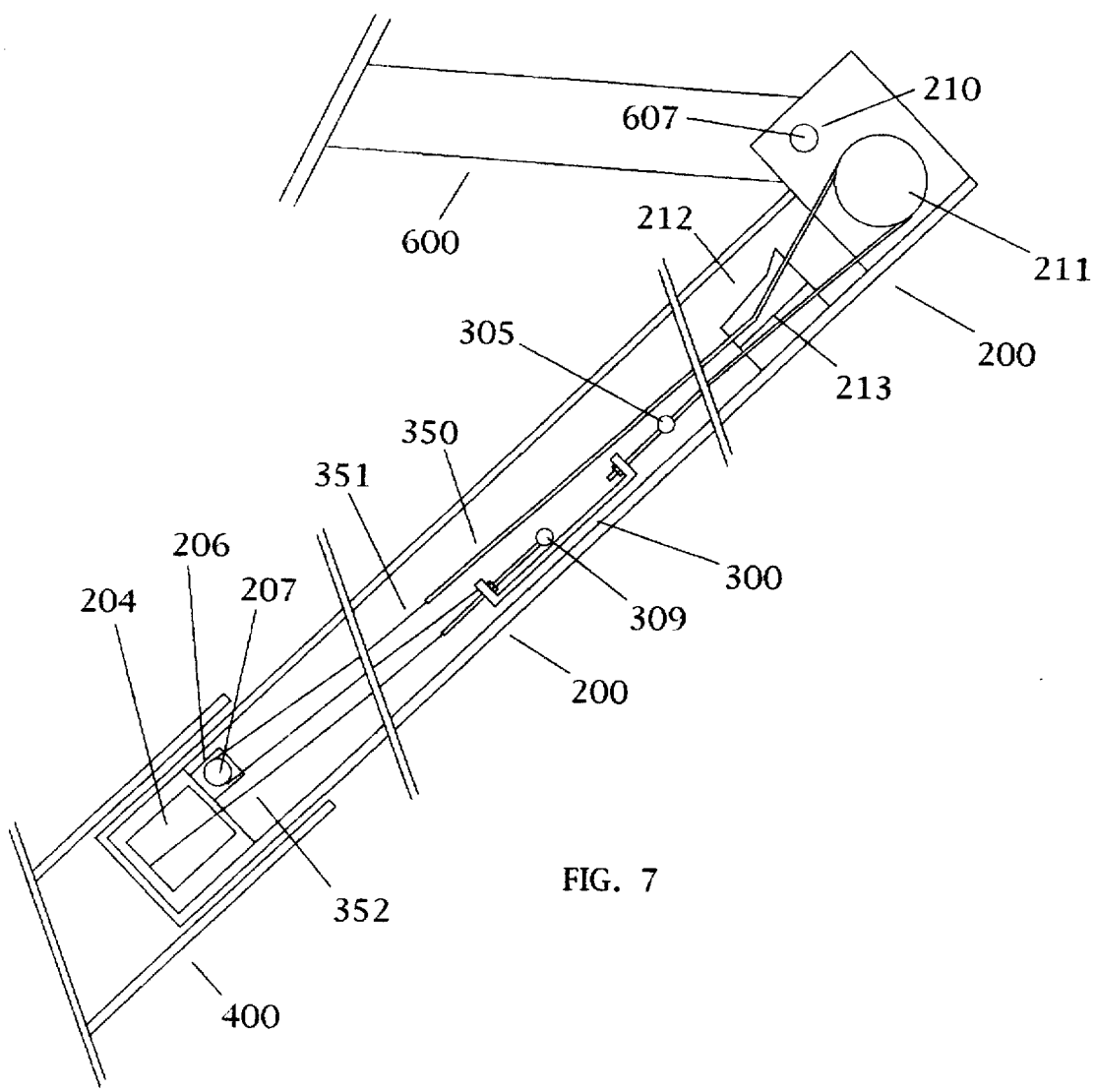
FIG. 7 is a somewhat diagrammatic side cross-sectional view of a support arm of the apparatus of FIG. 1, having the locking arm removed for drawing clarity.

An upper support arm 200 is seen in FIGS. 3, 4, 7, 8 and 9. Referring next to FIGS. 7 and 9, the upper support arm provides a rail body 201 that is sized to slide in a telescoping manner within the rail body 401 of the lower support arm 400. At its lower end, the rail body 201 carries a extension pulley housing 203 containing a extension pulley 204. The extension pulley is associated with the-extension of the upper support arm from within the lower support arm. A ¼" hole 214, defined in the pulley housing 203, allows the extension pulley wire 352 to pass. An opening 205 for a wire associated with the extension pulley is defined in the side of the rail body 201. A travel pulley bracket 206 extends from the extension pulley housing and carries a travel pulley 207. The travel pulley is associated with the travel, or movement, of the adjustment slide 300.

Referring in particular to FIG. 7, an upper bracket 209, carried by the rail body 201 defines a pivot hole 210 where the outer rafter arm 600 is pivotally carried. Referring also to FIG. 4, a sprocket 211 is carried within the bracket 209 on the axle 710 of the awning assembly. Referring to FIG. 7, a chain guide 212 having an internal separator 213 is best seen in the side view of FIG. 8. The chain guide prevents contact between different portions of chain 350. The separator 213 requires different portions of the chain moving in different directions to occupy different portions of the chain guide, and prevents chain wear and tear.

Figures 8, 8A:
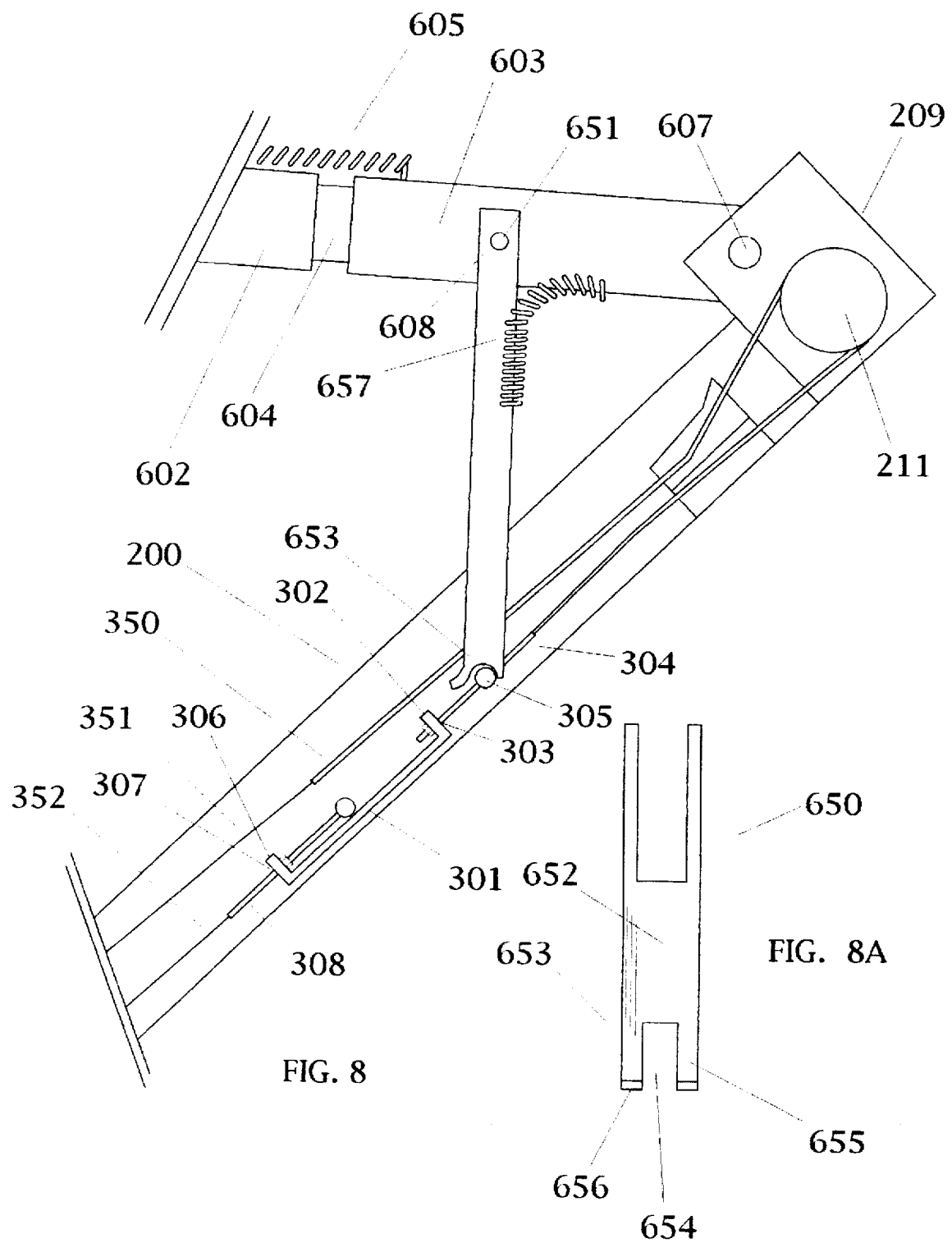
FIG. 8 is an enlarged view of the upper support arm seen in FIG. 7, additionally showing the locking arm.
FIG. 8A is an enlarged view of the locking arm.

An adjustment slide 300 is slidably carried within the rail body 201 of the upper support arm, and is best seen in FIGS. 7-9. The adjustment slide moves up the rail body 201 as the awning is extended, and down the rail body as the awning is retracted. As the adjustment slide moves upwardly, it pulls the extension pulley wire 352 which extends the upper support arm 200 telescopically from the lower support arm 400. The adjustment slide functions to allow adjustment of the extent to which the upper support arm is extended and also the point at which the locking arm 650 will be engaged.

Continuing to refer to FIGS. 7-9, the adjustment slide is seen to provide a slide body 301 having an upper flange 302 and a lower flange 306. The upper flange 302 defines a bolt hole 303 supporting a fabric tension adjustment bolt 304 which in turn supports a locking arm catch rod 305. A nut carried by the adjustment bolt 304 may be moved in either direction on the bolt, thereby controlling the d stance of the end of the bolt with respect to the upper flange. As a result, the distance from the slide at which the chain 350 is attached may be controlled. As a result, the fabric will be tighter or looser when fully extended. The catch rod is sized to engage the concave surface 656 of the prongs 655 of the bifurcated catch 653 of the locking arm 650 as will be seen.

The lower flange 306 defines a ⅛" bolt hole 307 caring a ⁵⁄₁₆" awning height adjustment bolt 308 carrying a chain protecting cylinder 309 that tends to prevent the chain 350 from wearing against the lower flange 306. The location of a nut carried by the adjustment bolt 308 determines how far the bolt may extend with respect to the lower flange. This distance may be adjusted by threading the nut in or out. As a result, the attachment location of the extension pulley wire with respect to the lower flange may be altered. This alters the degree to which the upper support arm telescopes out of the lower support arm, and therefore alters the height of the awning after full extension. The lower flange also carries an attachment point 310 for a travel pulley wire 351.

The chain 350 is carried by the sprocket 211, which in turn is carried by the axle 710. Rotation of the axle drives the sprocket, which in turn drives the chain. Referring to FIG. 8, as the awning is extended the sprocket rotates counter-clockwise; as the awning is retracted, the sprocket rotates clockwise.

The chain is connected at a first end to the upper end of the fabric tension adjustment bolt 304, and at a second end to the travel pulley wire 351.

Figure 5:
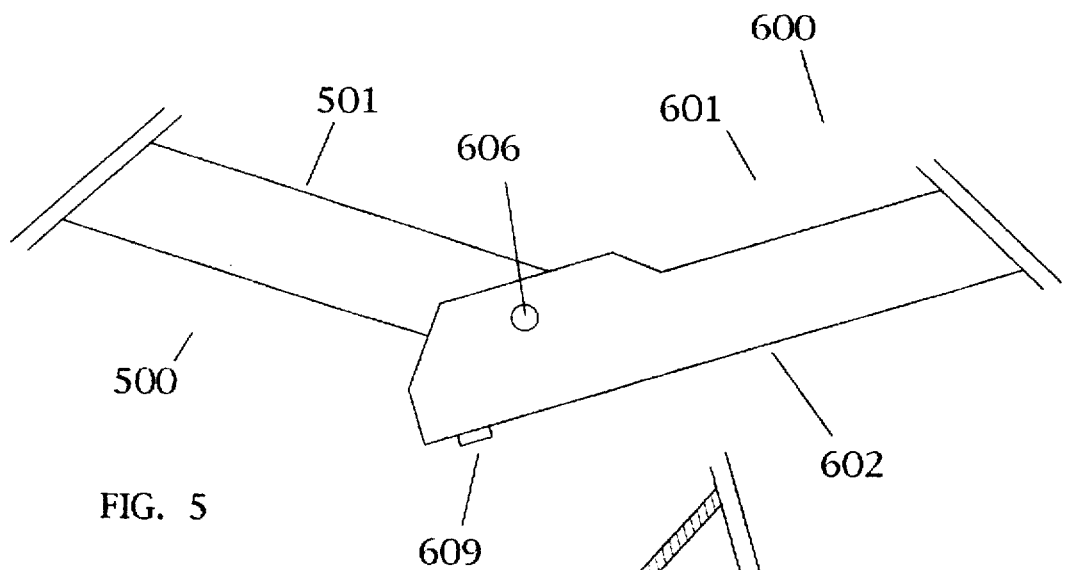
FIG. 5 is an enlarged view of the pivot portion of the rafter arm of the apparatus of FIG. 1.

Left and right rafter arms are formed from hingably related inner and outer rafter arms 500, 600. Referring in particular to FIGS. 2, 3, and 5, an inner rafter arm 500 is seen. The inner rafter arm provides a rail body 501 having an attachment bracket 502 at the inner end. The attachment bracket is typically mounted on an upper portion 102 of a supporting wall 101 or an RV 100 or other structure and allows the inner rafter arm to pivot with respect to the supporting wall.

The outer rafter arm 600 is pivotally connected to the inner rafter arm. The outer rafter arm provides a compound rail body 601 formed by an inner rail portion 602 and an outer rail portion 603. The inner and outer rail portions are both hollow, and enclose an inside rod 604. The inside rod keeps the inner and outer rail portions in a co-linear, telescopically extensible arrangement. The inside rod may be held in place with respect to either the inner or outer rail portion by means of a screw or other fastener. A spring 605 biases the inner and outer rail portions together, but allows them to separate slightly, as required, to prevent binding. A center pivot 606, best seen in FIG. 5, allows the outer rafter arm to pivot with respect to the inner rafter arm. An outer pivot 607, seen in FIGS. 7 and 8, allows a pivoting attachment to be made between the outer rafter arm and the upper bracket 209 carried by the upper end of the upper support arm. A locking arm pivot hole 608, seen in FIG. 8, allows pivotable attachment of the locking arm 650.

An over-center adjustment screw 609, typically carried by the outer rafter arm and seen in FIG. 5, prevents the inner and outer rafter arms from assuming a position wherein the angle between the arms above the center pivot point 606 is greater than 180 degrees. Should such as situation be allowed to occur the rafter arms would fail to fold in the manner seen in FIG. 2.

The locking arm 650 is pivotally carried by the outer rail portion 603 of the outer rafter arm 600. The locking arm locks into place as the awning is fully extended, making a rigid connection between the outer rafter arm and the upper support arm. The locking arm body 652 is supported by an upper pivot bolt 651. The body provides a lower bifurcated catch 653 defining dual prongs 655 separated by a chain slot 654 within which the chain 350 travels. A lower portion of each prong 655 forms a concave surface 656 that is shaped to engage the locking arm catch rod 305 carried by the fabric tension adjustment bolt 304 of the slide 301. A spring 657 biases the catch 653 in the counter-clockwise direction with respect to upper pivot bolt 651. As seen in FIG. 8, this biasing force keeps the catch pressed against the rail body 201 of the upper support arm 200, ready to engage the catch rod 305.

A drive assembly 800 rotates the axle 710 as the awning is extended and retracted. The drive assembly includes a motor 801 supported by a motor mount plate 802 and a drive chain 803 attached to the drive sprocket 709 on the axle 710. The motor typically is powered by 12 volts dc, and is equipped with a worm drive reduction acting as a brake whenever it stops. An enclosure 804 protects the motor, sprockets and drive chains.

The operation of the awning and extension apparatus is started by applying power to the motor. The motor's operation causes the drive chain 803 to rotate the drive sprocket 709, and in turn the axle 710. The roller, carried by the axle, rotates begins to rotate. After one revolution the awning fabric and roller extend approximately one foot from the supporting wall. The rotation also moves the chain 350, causing the adjustment slide 300 to move upwardly within the upper support arm 200. Depending on the setting of the nut carried by the awning height adjustment bolt 308, the extension pulley wire begins to pull the bolt into contact with the lower flange.

A second revolution of the roller 702 causes the awning fabric to extend approximately one more foot. The nut on the awning height adjustment bolt 309 contacts the lower flange 306, causing the upper support arm to begin to telescope out of the lower support arm. The inner and outer rafter arms tend to separate and pivot about their mutual hinged connection.

Subsequent revolutions of the roller cause the fabric to extend further, and the rafters to straighten. After approximately 7.5 revolutions the awning is almost extended. The rafters are almost straight and the locking arm catch rod 305 engages the catch 653 of the locking arm 650.

By the eighth revolution the fabric and roll have been fully extended. The inside rail has extended so that the roller will be approximately 6.5 feet off the ground. The catch of the locking arm will have been fully rotated in the counter-clockwise direction, to approximately the position seen in FIG. 8, causing the fabric to tighten. The rafters will not over-center, because of adjustment screw 609. As a result, when the motor is reversed, the rafter arms begin to immediately fold in the manner seen in FIG. 2. When the awning is fully extended, the motor is turned off.

To retract the awning, the motor is reversed, causing a reversal of the above result.

The previously described versions of the present invention have many advantages, including a primary advantage of providing a novel awning extension and retraction apparatus which is reliable, automatic and motor-driven.

Another advantage of the present invention is to provide a novel awning extension and retraction apparatus that is fully adjustable, with an adjustable slide member having separate fabric tension and awning height adjustment elements, as well as a separate awning height adjustment assembly for use after the awning has been extended for use in response to rain or changing sun angle.

Another advantage of the present invention is to provide a novel awning extension and retraction apparatus that provides an adjustable stop assembly to regulate the degree to which an upper support arm may telescope out of a lower support arm as the awning is extended.

A still further advantage of the present invention is to provide a novel awning extension and retraction apparatus having a locking arm, carried by the upper rafter arm, which engages a catch carried by an adjustment slide as the awning is fully extended, thereby maintaining the awning in a rigid configuration.

Although the present invention has been described in considerable detail and with reference to certain preferred versions, other versions are possible. For example, a hand crank version of the invention could also be produced, wherein substantially the same design would be used while substituting a manual crank for an electric motor. Similarly, the electric motor version of the invention could provide a manually operated crank as a supplemental source of operating power, available for emergency conditions where power was unavailable. And, while the primary application of the awning is for use with recreational vehicles, it is clear that the same technology could be employed for use with awnings mounted on houses, such deck and other locations, as needed. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for extending and retracting an awning from a supporting wall, comprising:
   (A) an awning assembly, comprising a rollable awning carried on a roller bar having an axle;
   (B) left and right support arms, each support arm having a first end carried by a lower portion of the supporting wall, and a second end attached to a left and a right end of the awning assembly, respectively;
   (C) left and right adjustment slides, slidably carried within the left and right support arms, respectively;
   (D) left and right rafter arms, carried by an upper portion of the supporting wall;
   (E) left and right locking arms, each locking arm having a first end pivotably carried by the left and right rafter arm, respectively and having a second end carried by the left and right adjustment slides, respectively; and
   (F) a drive assembly, carried by at least one upper support arm, comprising a motor having a drive chain in communication with the axle.

2. An apparatus for extending and retracting an awning from a supporting wall, comprising:
   (A) an awning assembly, comprising a rollable awning carried on a roller bar having an axle;
   (B) left and right support arms, carried by a lower portion of the supporting wall, each support arm comprising:
      (a) a bottom receiving rail assembly, comprising:
         (i) a support bracket, carried by a lower portion of the supporting wall; and
         (ii) a rail body, defining a plurality of adjustment holes, pivotably carried by the support bracket;
      (b) a lower support arm, comprising:
         (i) a rail body; and
         (ii) adjustment handle means, carried by the rail body, for adjustable attachment to the bottom receiving rail assembly;
      (c) an upper support arm, comprising:
         (i) a rail body;
         (ii) a extension pulley, carried by the rail body;
         (iii) a travel pulley, carried by the rail body;
         (iv) an upper bracket, carried by the rail body; and
         (v) a sprocket, carried by the axle within the upper bracket;
      (d) adjustable stop means, carried by the lower support arm, for preventing the lower support arm from separating from the upper support arm;
      (e) an adjustment slide, slidably carried within the rail body of the upper support arm, comprising:
         (i) a slide body carrying upper and lower flanges;
         (ii) a tension bolt, carried by the upper flange, the tension bolt supporting a locking arm catch rod; and
         (iii) an awning height adjustment bolt, carried by the lower flange;
      (f) a chain having a first end attached to the tension bolt, and having a middle portion passing around the sprocket;
      (g) a travel pulley wire, having a first end attached to the adjustment slide and a second end attached to a second end of the chain; and
      (h) a extension pulley wire, having a first end attached to the awning height adjustment bolt and a second end attached to the lower support arm;
   (C) left and right rafter arms, carried by an upper portion of the supporting wall; and
   (D) a drive assembly, carried by at least one upper support arm, comprising a motor having a drive chain in communication with the axle.

3. An apparatus for extending and retracting an awning from a supporting wall, comprising:
   (A) an awning assembly, comprising a rollable awning carried on a roller bar having an axle;
   (B) left and right support arms, carried by a lower portion of the supporting wall; left and right rafter arms, carried by an upper portion of the supporting wall, each rafter arm comprising:
      (a) an inner rafter arm, comprising:
         (i) an attachment bracket, carried by an upper portion of the supporting wall; and
         (ii) a rail body, pivotally carried by the attachment bracket;
      (b) an outer rafter arm, comprising:
         (i) a compound rail body, pivotally carried by the rail body of the inner rafter arm, comprising inner and outer rail portions slidably carried on an inside rod, the outer rail portion defining a locking arm pivot;
         (ii) biasing means, carried by the inner and outer rail portions of the compound rail body, for biasing the inner and outer rail portions together;
         (iii) stop means, in communication with the inner rafter arm and the outer rafter arm, for preventing the inner and outer rafter arms from assuming an over-center configuration; and
         (iv) a locking arm, carried by the locking arm pivot, having a lower end defining a bifurcated catch sized to engage the locking arm catch rod carried by the tension bolt; and (D) a drive assembly, carried by at least one upper support arm, comprising a motor having a drive chain in communication with the axle.

4. An apparatus for extending and retracting an awning from a supporting wall, comprising:
(A) an awning assembly, comprising a rollable awning carried on a roller bar having an axle;
(B) left and right support arms, carried by a lower portion of the supporting wall, each of the left and right support arms comprising:
  (a) a lower support arm having a rail body; and
  (b) an upper support arm, telescopically carried by the lower support arm, comprising:
    (i) a rail body;
    (ii) a extension pulley, carried by the rail body;
    (iii) a travel pulley, carried by the rail body;
    (iv) an upper bracket, carried by the rail body; and
    (v) a sprocket, carried by the axle within the upper bracket;
  (c) an adjustment slide, slidably carried within the rail body of the upper support arm, comprising:
    (i) a slide body carrying upper and lower flanges;
    (ii) a fabric tension bolt, carried by the upper flange, the tension bolt supporting a locking arm catch rod; and
    (iii) an awning height adjustment bolt, carried by the lower flange;
  (f) a chain having a first end attached to the fabric tension bolt, and having a middle portion passing around the sprocket;
  (g) a travel wire, having a first end attached to the adjustment slide, a middle portion wrapped about the travel pulley and a second end attached to a second end of the chain; and
  (h) extension wire, having a first end attached to the awning height adjustment bolt, a middle portion wrapped about the extension pulley and a second end attached to the lower support arm;
(C) left and right rafter arms, carried by an upper portion of the supporting wall: and
(D) a drive assembly, carried by at least one upper support arm, comprising a motor having a drive chain in communication with the axle.

5. An apparatus for extending and retracting an awning from a supporting wall, comprising:
(A) an awning assembly, comprising a roller, carried by an axle in communication with a drive sprocket; and
(B) left and right support arms, each support arm comprising:
  (a) a bottom receiving rail assembly, comprising:
    (i) a support bracket, carried by a lower portion of the supporting wall; and
    (ii) a rail body, defining a plurality of adjustment holes, pivotably carried by the support bracket;
  (b) a lower support arm, comprising:
    (i) a rail body; and
    (ii) adjustment handle means, carried by the rail body, for adjustable attachment to the bottom receiving rail assembly;
  (c) an upper support arm, comprising:
    (i) a rail body;
    (ii) a extension pulley, carried by the rail body;
    (iii) a travel pulley, carried by the rail body;
    (iv) an upper bracket, carried by the rail body; and
    (v) a sprocket, carried by the axle within the upper bracket;
  (d) adjustable stop means, carried by the lower support arm, for preventing the lower support arm from separating from the upper support arm;
  (e) an adjustment slide, slidably carried within the rail body of the upper support arm, comprising:
    (i) a slide body carrying upper and lower flanges;
    (ii) a tension bolt, carried by the upper flange, the tension bolt supporting a locking arm catch rod; and
    (iii) an awning height adjustment bolt, carried by the lower flange;
  (f) a chain having a first end attached to the tension bolt, and having a middle portion passing around the sprocket;
  (g) a connection wire, having a first end attached to the adjustment slide, a middle portion wrapped about the travel pulley and a second end attached to a second end of the chain; and
  (h) an upper support arm extension wire, having a first end attached to the awning height adjustment bolt, a middle portion wrapped about the extension pulley and a second end attached to the lower support arm;
(C) left and right rafter arms, each rafter arm comprising:
  (a) an inner rafter arm, comprising:
    (i) an attachment bracket, carried by an upper portion of the supporting wall; and
    (ii) a rail body, pivotally carried by the attachment bracket;
  (b) an outer rafter arm, comprising:
    (i) a compound rail body, pivotally carried by the rail body of the inner rafter arm, comprising inner and outer rail portions slidably carried on an inside rod, the outer rail portion defining a locking arm pivot;
    (ii) biasing means, carried by the inner and outer rail portions of the compound rail body, for biasing the inner and outer rail portions together;
    (iii) stop means, in communication with the inner rafter arm and the outer rafter arm, for preventing the inner and outer rafter arms from assuming an over-center configuration; and
    (iv) a locking arm, carried by the locking arm pivot, having a lower end defining a bifurcated catch sized to engage the locking arm catch rod carried by the tension bolt; and
(D) a drive assembly, carried by at least one upper support arm, comprising a motor having a drive chain in communication with the drive sprocket.

* * * * *